United States Patent [19]
Saitoh

[11] Patent Number: 5,386,521
[45] Date of Patent: Jan. 31, 1995

[54] INSTRUCTION PREFETCHING CIRCUIT WITH A NEXT PHYSICAL ADDRESS PRECALCULATING CIRCUIT

[75] Inventor: Takenori Saitoh, Ibaragi, Japan

[73] Assignee: NEC Corporation, Tokyo, Japan

[21] Appl. No.: 996,177

[22] Filed: Dec. 23, 1992

[30] Foreign Application Priority Data
Dec. 27, 1991 [JP]  Japan ................... 3-360126

[51] Int. Cl.⁶ ............... G06F 9/26; G06F 9/32; G06F 12/10
[52] U.S. Cl. .................... 395/375; 395/400; 395/250; 364/DIG. 1; 364/DIG. 2; 364/263.1; 364/255.1; 364/256.5; 364/948; 364/955
[58] Field of Search ............ 395/400, 375, 250

[56] References Cited
U.S. PATENT DOCUMENTS
4,847,748  7/1989  Yamahata et al. ............... 395/375

Primary Examiner—Parshotam S. Lall
Assistant Examiner—Timothy Lee Philipp
Attorney, Agent, or Firm—Foley & Lardner

[57] ABSTRACT

After a logical page number is stored, upon execution of a branch instruction, into a logical page number section in an effective address register, an address converting buffer is retrieved in accordance with a value obtained by addition of "1" to a logical page number of an instruction being executed at present, and a physical page number for a page-over is stored into a page-over address register. Thereafter, when a page-over occurs, the output of the page-over address register is selected by a physical page number selecting circuit and stored into the physical page number section in the instruction address register.

2 Claims, 2 Drawing Sheets

INSTRUCTION PREFETCHING CIRCUIT WITH A NEXT PHYSICAL ADDRESS PRECALCULATING CIRCUIT

BACKGROUND OF THE INVENTION

1. Field of the Invention

This invention relates to a data processing apparatus, and more particularly to an instruction prefetching circuit for a data processing apparatus.

2. Description of the Prior Art

A conventional instruction prefetching circuit has a page-over detecting circuit disposed at the input or the output of the instruction address register for detecting whether or not an address of a prefetched instruction goes over the boundary of the page (hereinafter referred to as page-over).

When a page-over is detected, the value (logical page number) of the effective address register in which an effective address of the instruction being executed at the point of time is stored is incremented by one using an address adder or some other adding means and the TLB (address converting buffer) is accessed so that a physical page number is determined. The thus determined physical page number is replaced by a physical page number portion of the instruction address register in which the physical page number before the page-over is stored.

By the way, in the conventional page-over processing method, in order to determine a physical page number in a physical address after a page-over has occurred, at least two cycles are required including a physical page number adding cycle and a TLB indexing cycle. Consequently, an overhead loss of at least two cycles is caused in instruction prefetching by the page-over processing. Accordingly, the conventional page-over processing method has a drawback that supply of an instruction is retarded by two cycles and execution of the instruction is retarded at least by two cycles.

SUMMARY OF THE INVENTION

It is an object of the present invention to provide an instruction prefetching circuit which is free from an overhead of a processing time for determining a physical address upon occurrence of a page-over.

Other features and advantages of the invention will be apparent from the following description in connection with the accompanying drawings.

DESCRIPTION OF THE PREFERRED EMBODIMENTS

Figure 1:
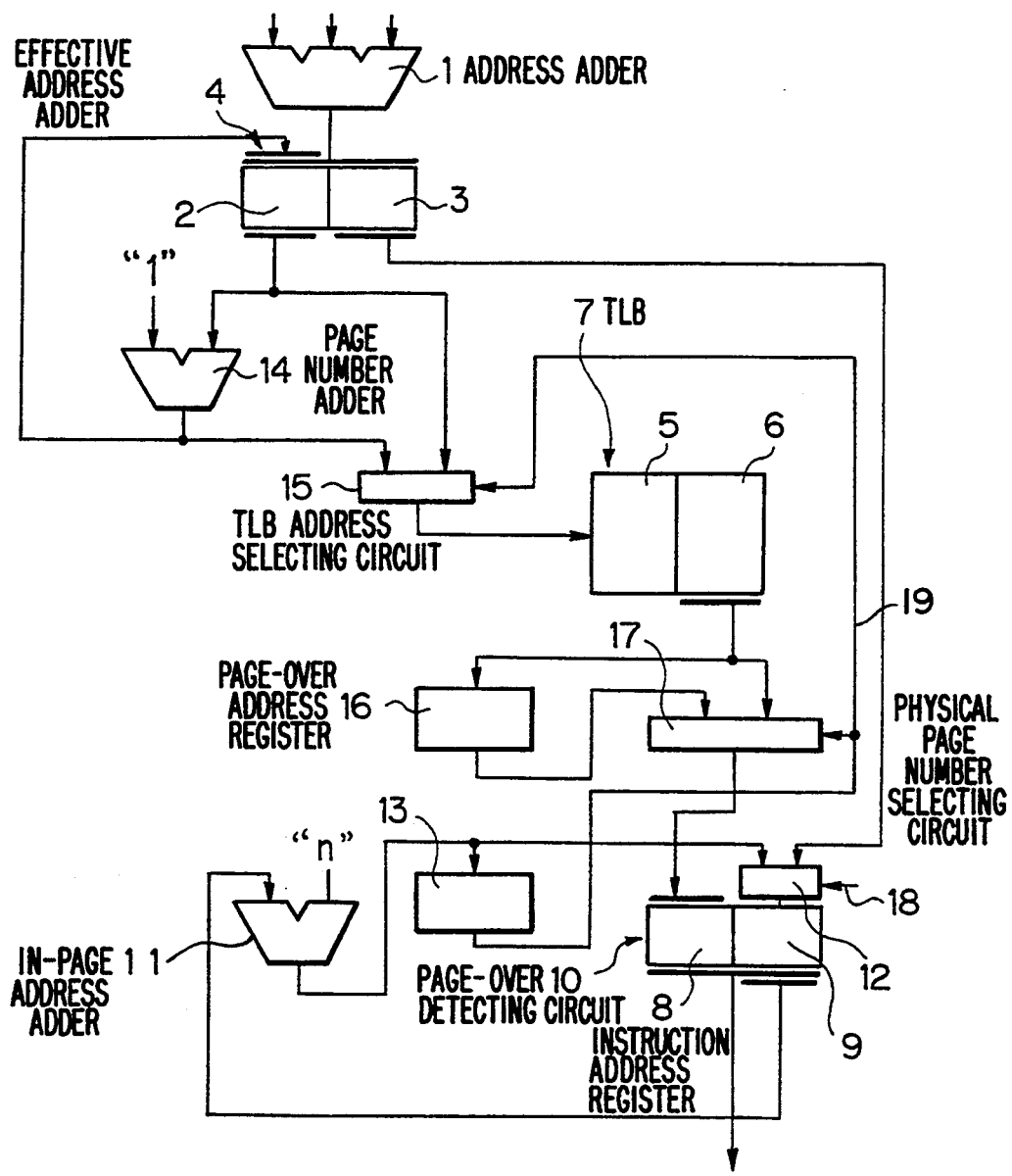
FIG. 1 a block diagram of an instruction prefetching circuit of a first preferred embodiment of the present invention and FIG. 2 is a block diagram of an instruction prefetching circuit of a second preferred embodiment of the present invention.

First, a first preferred embodiment of the present invention is described with reference to FIG. 1.

Address adder 1 receives an address base, an index and a displacement and calculates an instruction prefetching address. Effective address register 4 includes logical page number section 2 and in-page address section 3 into which a logical page number and an in-page address in the output of address adder 1 are stored, respectively. Page number adder 14 adds "1" to the logical page number stored in logical page number section 2 in effective address register 4. Address converting buffer (hereinafter referred to as TLB) 7 includes data section 6 in which a physical address is stored and key section 5 in which information for converting a logical address into a physical address is stored. TLB address selecting circuit 15 selects, when a page-over takes place, the output of page number adder 14, but when page-over detection signal 19 is inactive, that is, when no page-over takes place, TLB address selecting circuit 15 selects the output of logical page number section 2. TLB address selecting circuit 15 outputs the thus selected output as an address for indexing TLB 7. A physical address of data section 6 of TLB 7 is stored into page-over address register 16. Physical page number selecting circuit 17 selects, when page-over detection signal 19 is active, that is, when a page-over takes place, the physical address stored in page-over address register 16, but when page-over detection signal 19 is inactive, that is, when no page-over takes place, physical page number selecting circuit 17 selects the physical address stored in data section 6 of TLB 7. In-page address selecting circuit 12 receives branch instruction decode signal 18 and selects, when signal 18 is inactive (is not a branch instruction), an in-page address which is the output of in-page address adder 11, but when signal 18 is active, that is, when a page-over takes place, in-page address selecting circuit 12 selects the in-page address stored in in-page address section 3 of effective address register 4. Instruction address register 10 includes physical page number section 8 into which a physical page number selected by physical page number selecting circuit 17 is stored, and physical in-page address section 9 into which an in-page address selected by in-page address selecting circuit 12 is stored. In-page address adder 11 adds "n" (n is a natural number), which is an instruction fetching index, to the physical in-page address stored in physical in-page address section 9 of instruction address register 10. Page-over detecting circuit 13 supervises the output of in-page address adder 11, and, when a carry takes place, that is, when a page-over takes place upon next access, page-over detecting circuit 13 renders page-over detection signal 19 active and outputs it to TLB address selecting circuit 15 and physical page number selecting circuit 17. The output of page number adder 14 is stored into physical page number section 2 in effective address register 4 when a page-over takes place.

In the present embodiment, upon execution of a branch instruction, the output of data section 6 of TLB 7 is stored into physical page number section 8 of instruction address register 10, and thereafter, only the physical in-page address of physical in-page address section 9 is incremented by "n" by in-page address adder 11 to effect fetching of an instruction asynchronously with execution of another instruction.

Subsequently, operation when a branch instruction is executed and then a page-over takes place is described.

When a branch instruction is to be executed, first a branch destination address is calculated by address adder 1 and stored into effective address register 4. The output of in-page address section 3 of effective address register 4 is selected by in-page address selecting circuit 12 and stored into physical in-page address section 9 of instruction address register 10. Meanwhile, the output of logical page number section 2 of effective address register 4 is selected by TLB address selecting circuit 15 to index TLB 7, and a thus determined physical page number is selected by physical page number selecting circuit 17 and stored into physical page number section 8 of instruction address register 10. Thus, fetching of an instruction at the branch destination address stored in instruction address register 10 is started. In this instance, TLB 7 is retrieved again in accordance with a value obtained by addition of "1" to the logical page number of the branch destination address by page number adder 14, and a physical page number thus determined is stored into page-over address register 16. After the first fetching of the instruction at the branch destination address is completed, instruction fetching unit n is added to the value of physical in-page address section 9 of instruction address register 10 by in-page address adder 11 so that fetching of a succeeding instruction is performed successively.

Then, if a page-over is detected by page-over detecting circuit 13 and page-over detection signal 19 is rendered active, the physical page number stored in page-over address register 16 is selected by physical page number selecting circuit 17 and stored into physical page number section 8 of instruction address register 10. Then, fetching of an instruction based on the page-over address is started. In this instance, a logical address of the page-over is stored into logical page number section 2 of effective address register 4, and in order to make preparations for subsequent occurrence of a page-over, TLB 7 is indexed and a physical page number thus determined is stored into page-over address register 16.

In the present embodiment, when a logical page number is stored into logical page number section 2 in effective address register 4 upon execution of a branch instruction, TLB 7 is indexed in accordance with a value obtained by addition of "1" to a logical page number of the instruction being executed at present, and a physical page number of the page-over is stored into page-over address register 16. When a page-over takes place thereafter, the output of physical page number selecting circuit 17 is changed over from the output of data section 6 of TLB 7 to the output of page-over address register 16. Accordingly, the overhead of a processing time for determining a page-over physical address upon occurrence of a page-over is eliminated.

Figure 2:
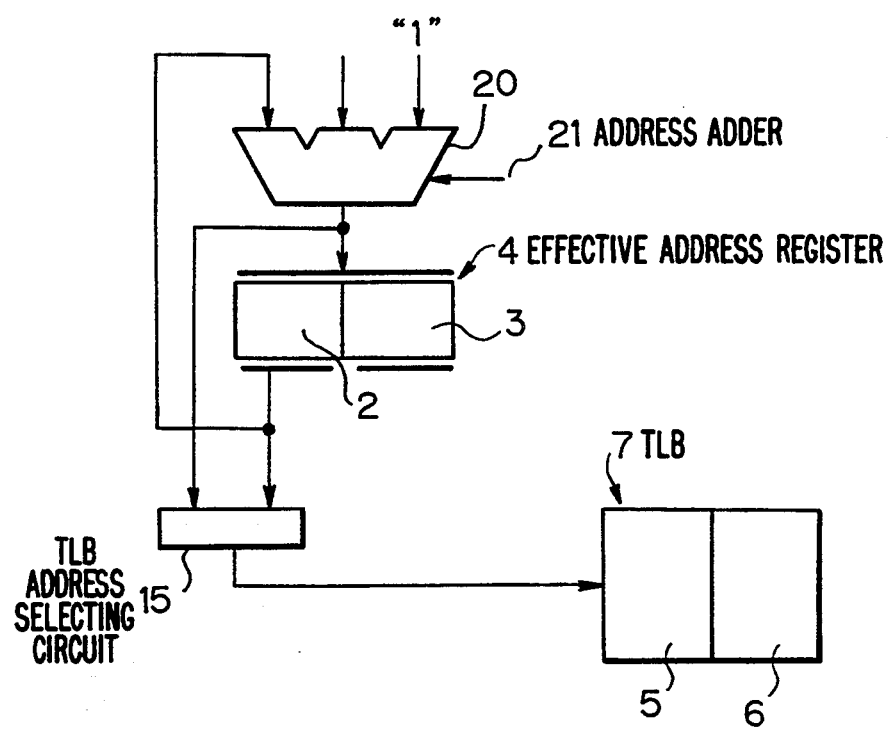

Subsequently, a second preferred embodiment of the present invention is described with reference to FIG. 2. In FIG. 2, only different components from those of the first embodiment are shown.

In the present embodiment, page number adder 14 is omitted, and address adder 1 is replaced by another address adder 20 which additionally has the function of adding "1+ to the output of logical page number section 2 in effective address register 3 when adder enabling signal 21 is active.

Accordingly, in the present embodiment, the amount of hardware is reduced comparing with the first embodiment.

While preferred embodiments of the invention has been described using specific terms, such description is for illustrative only, and it is to be understood that changes and variations may be made without departing from the spirit or scope of the following claims.

What is claimed is:

1. An instruction prefetching circuit, comprising:

address adding means for calculating an instruction prefetching address;

an effective address register including a logical page number section into which a logical page number from an output of said address adding means is stored and an in-page address section into which an in-page address in said output of said address adding means is stored;

page number adding means for adding "1" to an output of said logical page number section in said effective address register and storing a sum into said logical page number section in said effective address register;

an address converting buffer including a data section in which a physical address is stored and a key section in which information for converting a logical address into a physical address is stored;

address converting buffer address selecting means for selecting said output of said logical page number section of said effective address register when a page-over detection signal is inactive and selecting an output of said page number adding means when said page-over detection signal is active and for outputting a thus selected output as an address to said address converting buffer;

an instruction address register including a physical page number section into which a physical page number is stored and a physical in-page address section into which a physical in-page address is stored;

in-page address adding means for adding "n", n being a natural number, to an output of said physical in-page address section in said instruction address register;

page-over detecting means for receiving an output of said in-page address adding means and for rendering said page-over detection signal active when a next instruction goes over a boundary of a page;

a page-over address register into which an output of said data section of said address converting buffer is stored;

physical page number selecting means for selecting said output of said data section of said address converting buffer when said page-over detection signal is inactive but selecting an output of said page-over address register when said page-over detection signal is active and for storing a thus selected output into said physical page number section in said instruction address register; and in-page address selecting means for selecting an output of said in-page address section in said effective address register when a branch instruction decode signal is active and selecting said output of said in-page address adding means when said branch instruction decode signal is inactive and for storing a thus selected output into said physical in-page address section of said instruction address register.

2. An instruction prefetching circuit, comprising:

address adding means for calculating an instruction prefetching address;

an effective address register including a logical page number section into which a logical page number from an output of said address adding means is stored and an in-page address section into which an in-page address in said output of said address adding means is stored;

an address converting buffer including a data section in which a physical address is stored and a key section in which information for converting a logical address into a physical address is stored;

address converting buffer address selecting means for selecting an output of said logical page number section of said effective address register when a page-over detection signal is inactive and selecting said output of said address adding means when the page-over detection signal is active and for outputting a thus selected output as an address to said address converting buffer;

an instruction address register including a physical page number section into which a physical page number is stored and a physical in-page address section into which a physical in-page address is stored;

in-page address adding means for adding "n", n being a natural number, to an output of said physical in-page address section in said instruction address register;

page-over detecting means for receiving an output of said in-page address adding means and for rendering said page-over detecting signal active when a next instruction goes over a boundary of a page;

a page-over address register into which an output of said data section of said address converting buffer is stored;

physical page number selecting means for selecting said output of said data section of said address converting buffer when said page-over detection signal is inactive and selecting said output of said page-over address register when said page-over detection signal is active and for storing a thus selected output into said physical page number section in said instruction address register; and in-page address selecting means for selecting an output of said in-page address section in said effective address register when a branch instruction decode signal is active and selecting said output of said in-page address adding means when said branch instruction decode signal is inactive and for storing a thus selected output into said physical in-page address section of said instruction address register;

wherein said address adding means adds "1" to said output of said logical page number section in said effective address register when an adding means enabling signal is active.

* * * * *